United States Patent [19]

Emmons et al.

[11] Patent Number: 5,385,960
[45] Date of Patent: Jan. 31, 1995

[54] PROCESS FOR CONTROLLING ADSORPTION OF POLYMERIC LATEX ON TITANIUM DIOXIDE

[75] Inventors: William D. Emmons, Huntingdon Valley; William C. Finch, Blue Bell; Meredith A. Morgan, Lansdale, all of Pa.

[73] Assignee: Rohm and Haas Company, Philadelphia, Pa.

[21] Appl. No.: 65,883

[22] Filed: May 20, 1993

Related U.S. Application Data

[63] Continuation-in-part of Ser. No. 801,974, Dec. 3, 1991, abandoned.

[51] Int. Cl.[6] .......................... C08J 3/03; C08K 3/22; C08K 3/32; C08L 43/02
[52] U.S. Cl. ...................... 523/205; 523/200; 524/413; 524/414; 524/416; 524/547; 524/497
[58] Field of Search ............. 523/205; 524/547, 416, 524/414, 413

[56] References Cited

U.S. PATENT DOCUMENTS

| Re. 34,145 | 12/1992 | Martin | 523/205 |
|---|---|---|---|
| 1,766,592 | 6/1930 | Blumenfeld | 106/449 |
| 3,425,855 | 2/1969 | Barksdale et al. | 524/497 |
| 4,110,285 | 8/1978 | Pons et al. | 524/710 |
| 4,771,086 | 9/1988 | Martin | 523/205 |
| 4,798,854 | 1/1989 | Visca et al. | 523/334 |
| 5,135,970 | 8/1992 | Honel et al. | 523/414 |
| 5,204,388 | 4/1993 | Tonge et al. | 524/30 |

FOREIGN PATENT DOCUMENTS

| 0703802 | 2/1965 | Canada | 524/416 |
|---|---|---|---|
| 0113435 | 12/1983 | European Pat. Off. | |
| 0220841 | 5/1987 | European Pat. Off. | |
| 0502576 | 9/1992 | European Pat. Off. | |

OTHER PUBLICATIONS

International Search Report PCT/US92/09731.

*Primary Examiner*—Paul R. Michl
*Assistant Examiner*—Andrew E. C. Merriam
*Attorney, Agent, or Firm*—Wendy A. Taylor

[57] ABSTRACT

Coatings compositions including stable composite latex-pigment particles are prepared by dispersing titanium dioxide pigment particles in a first aqueous medium and preparing a dispersion of selected polymeric latex particles, which have at least one dihydrogen phosphate functional group, in a second aqueous medium. The media are mixed and the selected polymeric latex particles adsorb on the titanium dioxide particles. Dibasic phosphate is then provided to the mixture to stop adsorption and stabilize the composite particles. The coating composition gives a coating with improved hiding.

21 Claims, No Drawings

PROCESS FOR CONTROLLING ADSORPTION OF POLYMERIC LATEX ON TITANIUM DIOXIDE

CROSS REFERENCE TO RELATED APPLICATIONS

This application is a continuation-in-part of PCT International Application Serial No. PCT/US92/09731 filed Nov. 12, 1992 which is a continuation-in-part of U.S. patent application Ser. No. 07/801,974 filed Dec. 3, 1991, now abandoned.

BACKGROUND OF THE INVENTION

1. Field Of The Invention

This invention relates generally to a process for preparing aqueous compositions including polymeric latex and titanium dioxide pigment, and more particularly to aqueous compositions prepared for use as coatings compositions.

2. Background Of The Invention

Aqueous dispersions of polymeric latex are used to prepare a tremendous variety of commercially important products, including paints, coatings, primers, mastics, caulks, binders for non-woven materials, and adhesives. Frequently, the polymeric latex is included to form a continuous phase as the water is lost in order to bind the product together, and to contribute important physical properties.

Titanium dioxide has been for many years the pigment of choice for conferring opacity to plastic sheets and films, and particularly to coatings formed from coating compositions and paints. In paints titanium dioxide is typically the most expensive component of the formulation. It has been an ongoing objective of the coatings industry to achieve the desired degree of opacity in a coating while at the same time using as little titanium dioxide pigment as possible. One way in which this is done is by employing titanium dioxide which has an optimal average particle size and particle size distribution for scattering light. Another way of making efficient use of the titanium dioxide employed is by dispersing this pigment as well as possible.

Agglomerated or aggregated titanium dioxide pigment particles make less than their full potential contribution to the performance of the coatings, such as, for example, with regard to coating opacity and colorant potential.

The opacifying capability or hiding power of a paint or coating is a function of the spacing of the titanium pigment particles in the dried coating. The light scattering characteristics of titanium dioxide particles are well known. The average size and size distribution of titanium dioxide particles used for opacifying purposes has been highly optimized by the titanium dioxide manufacturers for maximum scattering. Maximum light scattering occurs when the titanium dioxide pigment particles have a diameter of from about 200 to about 250 nanometers and are spaced far apart from each other, on the order of a few particle diameters, so that there is minimal interference between the light scattering of neighboring particles.

In practice, however, for example in the formulation of paints, it is widely recognized that when enough titanium dioxide particles have been dispersed into the polymeric coating vehicle to yield films of acceptable opacity, the level of opacity which is achieved is significantly less than would be theoretically predicted from the light scattering potential of a single titanium dioxide particle multiplied by the total number of particles in the path of light passing through the film.

A number of factors have been identified which partially account for the diminution of opacity from the theoretical predictions. If two or more titanium dioxide particles are in actual contact with each other, or even if they are closer together than the optimum spacing distance, the particles will behave like a single aggregated larger particle and result in reduced light scattering. This occurs if the titanium dioxide particles are not adequately deaggregated during the dispersion process. However, even if the titanium dioxide particles are fully deaggregated in the dispersion process, a random distribution of particles will not provide the maximum scattering achievable in theory if the particles were optimally distributed.

In a related phenomenon, referred to as "crowding," titanium dioxide pigment particles are forced to be nearer to each other than the desired optimum merely by the lack of available space. This lack of available space may be caused by the space taken up by the other coating fillers and extenders which are of a comparable size to, or which are larger than, the pigment particles. In the case of polymeric binders, which are particulate in nature prior to film formation, such as, for example, latex or emulsion polymers, and in the case of nonaqueous dispersion polymers, the binder polymer particles themselves can crowd pigment particles, especially if they are of comparable or larger in size than the titanium dioxide particles.

There is a continuing need to improve the effective utilization of inorganic materials such as titanium dioxide in aqueous coating compositions and thereby to improve the opacity and other performance properties of coating compositions.

SUMMARY OF THE INVENTION

The present invention provides a controlled adsorption process for preparing an aqueous dispersion of composite particles, the composite particles each including a plurality of selected polymeric latex particles adsorbed onto a titanium dioxide particle. In the present process, long term aggregation of the composite particles, which may otherwise adversely increase viscosity, is avoided. The resulting composite particles provided by the present invention can be used in preparing formulated aqueous compositions, such as coating compositions, paints, and inks, which in turn give coatings which show improved opacity compared to prior art formulations. The coatings compositions themselves show good viscosity stability, and enhanced resistance to flocculation during preparation. In addition, benefits in a variety of coatings applications properties, including hiding, gloss, thickener efficiency, slurry compatibility, flow and leveling, color acceptance, color float, syneresis, whiteness, metal marring resistance, and water spot resistance are provided.

In one aspect the present invention provides a process which comprises:

a) dispersing titanium dioxide pigment particles in a first aqueous medium;

b) preparing a dispersion or suspension of selected polymeric latex particles in a second aqueous medium, the selected polymeric latex particles having at least one dihydrogen phosphate functional group;

c) mixing the aqueous media containing the titanium dioxide pigment particles and the polymeric latex particles;

d) permitting the selected polymeric latex particles to adsorb on the titanium dioxide particles; and e) then providing dibasic phosphate to the mixture of selected polymeric latex particles and titanium dioxide particles.

In this aspect of the process of the present invention, the titanium dioxide particles are dispersed in a first aqueous medium to form a slurry or pigment grind. This step can be carried out by the pigment supplier to give a pigment slurry ("slurry grade titanium dioxide"), or a dry grade of titanium dioxide can be used to prepare a slurry at the site where the coating composition is being prepared. Subsequently, this first aqueous dispersion is mixed with a second aqueous medium including dispersed polymeric latex particles. Preferably, the first aqueous dispersion containing the titanium dioxide particles is added to the second aqueous dispersion containing the polymeric latex particles rather than visa versa. These polymeric latex particles are selected from among those which have at least one dihydrogen phosphate functional group, such as those prepared by emulsion polymerization of a mixture of copolymerizable monomers including a copolymerizable dihydrogenphosphate functional monomer. These polymeric latex particles adsorb to titanium dioxide particles, and are in the alternative referred to as "selected polymeric particles" in the present specification and claims. Dibasic phosphate is then provided to the mixture of titanium dioxide particles and selected polymeric latex particles, for example, by adding a water-soluble phosphate salt. Preferably, the dibasic phosphate is added in an amount effective to inhibit a continued increase in viscosity.

In another aspect of the process of the present invention, the titanium dioxide pigment particles may be dispersed directly in an aqueous medium which already contains the selected polymeric latex particles. If desired, an inorganic particle dispersant can be employed, although it is preferred to avoid particle dispersants which are believed to reduce the extent to which the selected polymeric latex particles adsorb to the titanium dioxide particles, such as those which include a large proportion of acid-functional residues, such as salts of polyacids, for example, sodium polyacrylate. Such particle dispersants can be referred to as "strong" dispersants.

In this embodiment, the present invention provides a process comprising:

a) preparing a dispersion or suspension of selected polymeric latex particles in an aqueous medium, the selected polymeric latex particles having at least one dihydrogen phosphate functional group;

b) dispersing titanium dioxide pigment particles in the aqueous medium;

c) permitting the selected polymeric latex particles to adsorb on the titanium dioxide particles to a predetermined extent; and d) then providing an effective amount of dibasic phosphate to the mixture of selected polymer latex particles and titanium dioxide particles.

In some cases it has been observed that the viscosity of fully formulated coatings compositions including composite particles having selected polymeric latex particles adsorbed to titanium dioxide particles has not been stable, and has tended to increase with time. This effect is believed to be related to the continued adsorption of the selected polymeric latex particles to titanium dioxide particles during storage, and to the possible formation of aggregates of composite particles which include two or more titanium dioxide particles. The continued increase in viscosity during storage is generally undesirable for many applications, as coatings compositions are frequently formulated to exhibit a desired, predetermined viscosity and/or rheology during application. Some control the upward drift in viscosity in such systems can be achieved by addition of a non-ionic surfactant and/or by optimizing the particle size of the selected polymeric latex particles so that the number ratio of polymeric latex particles to titanium dioxide particles is great enough to maximize coverage of the titanium dioxide particle surface with adsorbed polymeric latex particles. Nevertheless, in the case of some grades of titanium dioxide particles, it has been found that addition of dibasic ammonium phosphate effectively terminates the adsorption process.

Thus, in one aspect of the present process, the polymeric latex particles are permitted to adsorb to the titanium dioxide particles to a predetermined extent or for a predetermined period. A period as little as about ten minutes is sufficient in some cases. Preferably, the adsorption is permitted to continue for at least about one half hour, and typically from about one half hour to about four hours. At that point dibasic phosphate is provided to the mixture of selected polymeric latex particles and titanium dioxide particles. Preferably, the dibasic phosphate is provided in an effective amount, that is an amount effective to control viscosity development presently believed to be attributable to further adsorption of the selected polymeric latex particles. Providing the dibasic phosphate is preferably accomplished by adding a small amount of a water-soluble phosphate salt, preferably, a dibasic salt such as dibasic ammonium phosphate, the small amount preferably being from about 0.25 to 2 weight percent (based on titanium dioxide solids and expressed as dibasic ammonium phosphate). The provision of dibasic phosphate is believed to effectively terminate the adsorption process for certain grades of titanium dioxide, and thus adsorption can be fixed at any desired level for those grades.

Thus, the present invention provides a means of enhancing the storage stability of products formulated using composite particles including titanium dioxide and adsorbed polymeric latex particles.

Titanium dioxide particles are available commercially both in the form of aqueous slurries and as dry pigment, and with a variety of surface treatments, depending on the intended application. Some components of commercially available slurries, such as sodium or ammonium polyelectrolyte dispersants, may inhibit adsorption of polymer latex particles on the titanium dioxide particles, as may certain surface treatments. Consequently, the extent and strength of adsorption depends on both the grade and physical form of the titanium dioxide and the identity of the polymeric latex particles employed. The present invention provides a means of increasing the hiding obtainable and of reducing the variability in hiding otherwise associated with different grades of titanium dioxide.

In addition to the selected polymeric latex, other components can be added depending on the application for the aqueous composition. For example, a film-forming binder such as a relatively soft polymeric latex can be included, as well as other conventional components used to provide a formulated coating composition, such as coalescents, preservatives, thickeners, and rheology control agents.

In one embodiment of the present invention, the selected polymeric latex particles are preferably polymerized from monomer which provides polymer which is hard or rigid at the temperature at which the aqueous composition is to be used, such as monomer which provides a polymeric material with an effective glass transition temperature of at least about 20° C., more preferably at least about 35° C., and even more preferably at least about 50° C. in the case of a composition applied at ambient or room temperature (that is, at about 20°–23° C.). Higher temperature ranges may be more appropriate for applications at higher temperatures, such as baked coatings.

In a second embodiment of the present invention, the process of this invention contemplates preparing a mixture of at least two types of polymeric latex particles, the first type being the selected polymeric latex particles, and preferably having an effective glass transition temperature of at least about 20° C., more preferably at least about 35° C., and even more preferably at least about 50° C. The second type of polymeric latex particle is provided to form a binder for the titanium dioxide pigment particles. The mixture can be used to prepare formulated compositions, such as coating compositions, which show improved opacity.

In a third, and presently preferred embodiment of the present invention, the selected polymeric latex has a relatively low effective glass transition temperature, that is, from about − 50° C. to about 20° C., and serves as a binder for the composition.

In yet another embodiment, two or more types of soft polymeric particles are employed as binders, one or more of these being the selected polymer latex.

The improved opacity and other coatings performance properties provided by the present invention advantageously provides greater flexibility in preparing aqueous compositions including polymeric latex and dispersed titanium dioxide pigment. For example, in some cases the present process provides a means of reducing the amount of titanium dioxide pigment required to provide the desired opacification. When the selected polymeric latex is used in coating compositions, the present process provides improved coating properties, such as opacity or hiding, tint strength, mechanical properties, "ICI" or "cone-and-plate" (high shear rate) viscosity, gloss, and scrub resistance. The process also provides coating compositions giving coatings with improved opacity for a given titanium dioxide pigment level. An important improvement provided by the process of the present invention is an improvement in the color acceptance of formulated coatings compositions. Similarly, improvements can be obtained in the mechanical stability, the chemical stability, the tendency of added colorant to separate, and the metal marring resistance.

The selected polymeric latex particles used in the process of this invention are particularly useful for improving the performance properties of coatings and paints formed therefrom. Alternatively, the process of the invention offers the ability to formulate coatings and films of substantially equal performance properties as conventional systems but with lower concentrations of expensive titanium dioxide pigment, and accordingly at lower cost. The process of the present invention further contemplates preparing fully formulated aqueous compositions, including aqueous coating compositions, using the selected polymeric latex particles, and the subsequent use of the fully formulated aqueous compositions to form products, including coatings, and coated articles.

DETAILED DESCRIPTION

The process of this invention contemplates preparing a dispersion or suspension of selected polymeric latex particles in the aqueous medium. These polymeric latex particles are selected to adsorb onto the dispersed titanium dioxide particles to provide composite particles, each including both a titanium dioxide particle and adsorbed polymeric latex particles. The titanium dioxide particles remain dispersed in the aqueous medium during and after adsorption of the polymeric latex particles, that is, during their transformation into composite particles. The selected polymeric latex particles can be chosen to strongly adsorb onto the titanium dioxide particles. In some cases, the selected polymeric latex particles are believed to, in effect, irreversibly adsorb onto the titanium dioxide particles. In at least some cases, it is believed that previously adsorbed pigment dispersant is displaced by the adsorbed polymeric latex particles.

The process of the present invention employs selected polymeric latexes for use in aqueous compositions including titanium dioxide pigment particles. In many cases, the titanium dioxide pigment particles are initially dispersed using a pigment dispersant, such as a polyelectrolyte dispersant, or a steric stabilization agent.

The process provides a solution to the problem of how to practically utilize selected polymeric latex particles to improve the opacity of aqueous-based coatings containing high concentrations of titanium dioxide pigment particles by adsorption of the selected polymeric latex particles to titanium dioxide particles to form composite particles for preparing fully formulated coatings compositions, while increasing the long-term stability of the fully formulated coatings compositions.

Polymeric latex particles of selected composition, size and surface charge can be effectively used in the process of the present invention along with titanium dioxide particles, in concentrated dispersions. The selected polymeric latex particles are believed to function in the process by adsorbing onto the surface of the titanium dioxide particles in the presence of any initially adsorbed pigment dispersant. While not being bound by any particular theory of the molecular mechanism of the process of the present invention, it is presently believed that the initial pigment dispersant adsorbed to the surface of the titanium dioxide particles is in equilibrium with initial pigment dispersant in the aqueous medium, that the initial pigment dispersant does not completely cover the surface of the titanium dioxide particles at all times, and that at least a portion of the surface of the titanium dioxide particle is available for adsorption of the selected polymeric latex particles.

The preferred polymeric latex particles are believed to adsorb essentially irreversibly on the surface of the titanium dioxide particles, so that in time the initial pigment dispersant is replaced at least to some extent on the surface by the polymeric latex. The polymeric latex is preferably selected to provide this strong adsorption. This can be accomplished in different ways. In one presently preferred embodiment, a polymeric latex is polymerized from monomer mixture including at least one polymerizable ethylenically unsaturated dihydrogen phosphate ester, such as a dihydrogen phosphate ester of 2-hydroxyethyl methacrylate.

The present process is particularly useful for improving the opacity, gloss, high shear viscosity, color development, permeability, and mechanical properties of coatings and films formed therefrom. Alternatively, the invention offers the ability to formulate coatings and films of substantially equal performance properties as conventional systems but with lower titanium dioxide pigment particle concentrations and accordingly at lower cost.

The process of the present invention is particularly useful in the alkaline pH range in which aqueous coatings compositions and paints are frequently formulated, such as from about 7 to 10.

Titanium dioxide particles which have been subjected to prior surface treatment processes can be used in the process of the present invention. For example, titanium dioxide is available with various types of prior surface treatments which provide surface coatings of alumina or silica or mixtures of both, as discussed in A. Brisson et al., *J. Coatings Tech.* 63 59 –65(1991).

The process of the present invention is believed to be dependent to some extent on the relative concentrations and particle sizes of the selected polymeric latex particles and the titanium dioxide pigment particles with more polymeric latex particles being required at a higher concentrations of titanium dioxide for optimum performance. Preferably, enough of the selected polymeric latex is employed to obtain optimum performance properties in fully formulated products prepared using the process.

Depending on the relative particle sizes and relative number concentrations of the selected polymeric latex particles and the titanium dioxide pigment particles, it has been found in some cases that after composite particles have been formed initially by adsorption of the selected polymeric latex particles on the titanium dioxide particles, there has been an upward drift in the viscosity of the aqueous dispersion of composite particles or in the viscosity of aqueous coatings compositions in which the composite particles have been dispersed. While the mechanism of the viscosity drift in not known, it is presently considered to be attributable to the aggregation of composite particles, such as by the "bridging" of two titanium dioxide particles by a single selected polymeric latex particle. The process of the present invention advantageously provides a means of arresting this undesirable upward drift in viscosity. While the mechanism of the process of this invention is not completely understood, it is presently thought that by providing a species with a single functional group to interact with the surface of the titanium dioxide particles, such as a low molecular weight, dibasic phosphate functional group, such "bridging" by selected polymeric latex particles is inhibited.

In preparing coating formulations possessing desirable performance properties it is not necessary that the selected polymeric latex used in the process of the invention also function as the polymeric binder for the coating or film, although this may be possible or even desirable in some cases, as in one presently preferred embodiment. Instead, another polymeric latex material, preferably having a glass transition temperature tending to provide good film formation properties under the application conditions, can be provided to serve this function. By "glass transition temperature" is meant the second order phase transition temperature as determined empirically by mechanical methods as torsional braid analysis and the like or as calculated from monomer composition by the method of Fox. By "effective glass transition temperature" is meant the second order phase transition temperature of the polymeric material as modified by the presence of low molecular weight species such as coalescents, solvent, and the like. The function of the selected polymeric latex in contrast is to improve the opacity of the film formed by the polymeric binder latex and the titanium dioxide pigment particles. To serve this function, it may be desirable that the selected polymeric latex particles be relatively rigid, having a relatively high effective glass transition temperature under the application conditions, for example, at least about 20° C., more preferably at least about 35° C., and even more preferably at least about 50° C. Thus, a first presently preferred embodiment of the present invention provides an aqueous mixture of the selected, opacity-improving "hard" polymeric latex particles and the non-selected, film-forming "soft" polymeric latex particles for use in preparing formulated aqueous compositions, such as coating compositions.

In a first presently preferred embodiment of the process of the present invention, the selected polymeric latex particles do not themselves provide a binder for the product formed by the fully formulated aqueous composition. Because they are not required to flow and form a film, the particles can be more rigid than those employed to provide a binder. Thus, the polymeric particles can have a higher effective glass transition temperature than polymeric particles employed to serve as binder, and/or can include rigidifying levels of crosslinking. In this case the polymeric latex can also be prepared by standard emulsion polymerization techniques, but typically will not be suitable for use as a film-forming binder.

With regard to the average particle size or diameter of the selected polymeric latex particles and the titanium dioxide pigment particles employed in the present process, it is generally preferred that the selected polymeric latex particles have an average diameter of from about 20 nanometers ("nm") to about four times that of the titanium dioxide pigment particles, and more preferably from about 20 nm to about the same diameter as that of the titanium dioxide pigment particles. In one presently preferred embodiment, in the case of selected "hard" polymeric latex particles, an average polymer latex diameter from about 30 nm to about 100 nm is preferred, and an average polymer latex diameter from about 50 nm to 80 nm is especially preferred.

In a second presently preferred embodiment of the process of the present invention, the selected polymeric latex particles themselves do provide a binder for the product formed by the fully formulated aqueous composition. In this case an average polymeric latex particle diameter of from about 80 nm to 600 nm is preferred, and an average particle diameter of less than about 135 nanometers is more preferred, and a particle size of about 105 nm is especially preferred. In this case the polymeric latex can also be prepared by standard emulsion polymerization techniques. The optimum size of selected polymeric latex particles is believed to depend to some extent on the level of the functionality incorporated in the selected polymeric latex particles, with particle size varying inversely with the level of functionality.

The concentration of the titanium dioxide particles (and any other pigments which may be present in the composition) in a coating formulation is expressed in terms of the pigment volume concentration of the formulation. The pigment volume concentration (hereinafter referred to as the "PVC") of a formulation is defined as the volume amount of inorganic particles, including titanium dioxide and other pigment particles as well as extender particles, present in the formulation, divided by the sum of the volume amount of such inorganic particles plus polymeric latex particle solids in the formulation and expressed herein as a percentage. Preferably, the PVC of compositions prepared according to the present invention is from about 5 to 60 percent, and more preferably from about 10 to 50 percent.

The overall concentration of pigment particles, extender particles and emulsion polymer particles in a formulation is typically expressed in terms of a percent volume solids for the formulation. The percent volume solids is an expression of the extent of the dilution of the solids in a liquid vehicle, such as water.

The polymeric latexes used in the practice of the present invention can have monomer compositions and particle sizes closely related to polymeric latex binders prepared by standard emulsion polymerization techniques known in the art.

The selected polymeric latex particles can be prepared by any process which provides copolymerization of species including adsorption-inducing functional groups, such as dihydrogen phosphate-functional monomers. The selected polymeric latex particles useful in the process of this invention may be prepared by several alternative processes. In one such process, the monomer mixture from which the polymeric latex is polymerized includes at least one dihydrogen phosphate ester of an alcohol in which the alcohol contains a polymerizable olefinic group, such as a polymerizable vinyl group. Examples of such dihydrogen phosphate esters include allyl phosphate, allyl Cellosolve ® phosphate, hydroxyethyl methacrylate phosphate, the mono- or diphosphate of bis(hydroxyethyl) fumarate or itaconate, etc. In particular, polymeric latex particles polymerized from monomer mixtures including the dihydrogen phosphate ester of 2-hydroxyethyl methacrylate are preferred. Cellosolve is a trademark of Eastman Kodak Chemical Co.

Alternatively, the polymeric latex particles may be prepared by polymerization and subsequently functionalized to give selected polymeric latex particles. Those skilled in the art may employ various synthetic routes to prepare suitably functionalized polymeric latex particles. For example, an amine-functional polymeric latex could be reacted under basic conditions with a compound including both epoxy and phosphate functional groups. Similarly, an epoxy-functional latex could be reacted with an compound including both phosphate and amino groups.

Thus, the present invention provides aqueous dispersions, coating compositions, and pigment slurries including selected polymeric latex particles and titanium dioxide pigment particles, selected polymeric latex particles including dihydrogen phosphate ester functional groups.

These dihydrogen phosphate ester functional groups can result from the polymeric latex particles being polymerized from monomer including at least one polymerizable dihydrogen phosphate-functional monomer, although other methods of preparation of dihydrogen phosphate ester-functional polymeric latexes may be used. The polymerizable dihydrogen phosphate-functional monomer can be selected from the dihydrogen phosphate esters of an alcohol, the alcohol including a polymerizable group selected from polymerizable vinyl groups and polymerizable non-vinyl olefinic groups. The polymerizable dihydrogen phosphate-functional monomer can be selected from the dihydrogen phosphate monoester of 2-hydroxyethyl methacrylate, and mixtures of the dihydrogen phosphate monoester of 2-hydroxyethyl methacrylate and the phosphoric acid diester of 2-hydroxyethyl methacrylate.

The polymeric latex used in the present invention can be prepared by any technique known in the art, such as suspension polymerization or emulsion polymerization. Emulsion polymerization techniques for preparing aqueous dispersions of latex polymer particles from ethylenically unsaturated monomers are well known in the polymer arts, and any conventional emulsion technique can be used, such as single and multiple shot batch processes, and continuous processes. If desired, a monomer mixture can be prepared and added gradually to the polymerization vessel. The monomer composition within the polymerization vessel can be varied during the course of the polymerization, such as by altering the composition of the monomer being fed into the vessel. Both single and multiple stage polymerization techniques can be used. The latex polymer particles can be prepared using a seed polymer emulsion to control the number of particles produced by the emulsion polymerization as is known in the art. The particle size of the latex polymer particles can be controlled by adjusting the initial surfactant charge as is known in the art. The preparation of polymeric latexes is discussed generally in D. C. Blackley, *Emulsion Polymerization* (Wiley, N.Y. 1975). The preparation of acrylic polymeric latexes is described in, for example, *Emulsion Polymerization of Acrylic Polymers*, Bulletin, Rohm and Haas Company, Philadelphia.

A polymerization initiator can be used in carrying out the polymerization of the polymeric latex particles. Examples of polymerization initiators which can be employed include polymerization initiators which thermally decompose at the polymerization temperature to generate free radicals. Examples include both water-soluble and water-insoluble species. Examples of free radical-generating initiators which can be used include persulfates, such as ammonium or alkali metal (potassium, sodium or lithium) persulfate; azo compounds such as 2,2'-azo-bis(isobutyronitrile), 2,2'-azo-bis(2,4-dimethylvaleronitrile), and 1-t-butyl-azocyanocyclohexane); hydroperoxides such as t-butyl hydroperoxide and cumene hydroperoxide; peroxides such as benzoyl peroxide, caprylyl peroxide, di-t-butyl peroxide, ethyl 3,3'-di-(t-butylperoxy) butyrate, ethyl 3,3'-di(t-amylperoxy) butyrate, t-amylperoxy-2-ethyl hexanoate, and t-butyl-peroxy pivilate; peresters such as t-butyl peracetate, t-butyl perphthalate, and t-butyl perbenzoate; as well as percarbonates, such as di(1-cyano-1-methylethyl)-peroxy dicarbonate; perphosphates, and the like.

Polymerization initiators can be used alone or as the oxidizing component of a redox system, which also includes a reducing component such as ascorbic acid, malic acid, glycolic acid, oxalic acid, lactic acid, thiogycolic acid, or an alkali metal sulfite, more specifically a hydrosulfite, hyposulfite or metabisulfite, such as sodium hydrosulfite, potassium hyposulfite and potassium metabisulfite, or sodium formaldehyde sulfoxylate. The reducing component is frequently referred to as an accelerator.

The initiator and accelerator, commonly referred to as catalyst, catalyst system or redox system, can be used in proportion from about 0.001% to 5% each, based on the weight of monomers to be copolymerized. Accelerators such as chloride and sulfate salts of cobalt, iron, nickel or copper can be used in small amounts. Examples of redox catalyst systems include tertbutyl hydroperoxide/sodium formaldehyde sulfoxylate/Fe(II), and ammonium persulfate/sodium bisulfite/sodium hydrosulfite/Fe(II). The polymerization temperature can be from room temperature to about 90° C., and can be optimized for the catalyst system employed, as is conventional.

Chain transfer agents can be used to control polymer molecular weight, if desired. Examples of chain transfer agents include mercaptans, polymercaptans and polyhalogen compounds. Examples of chain transfer agents which may be used include alkyl mercaptans such as ethyl mercaptan, n-propyl mercaptan, n-butyl mercaptan, isobutyl mercaptan, t-butyl mercaptan, n-amyl mercaptan, isoamyl mercaptan, t-amyl mercaptan, n-hexyl mercaptan, cyclohexyl mercaptan, n-octyl mercaptan, n-decyl mercaptan, n-dodecyl mercaptan; alcohols such as isopropanol, isobutanol, lauryl alcohol and t-octyl alcohol; halogenated compounds such as carbon tetrachloride, tetrachloroethylene, and tricholorobromoethane. Generally from 0 to 10% by weight, based on the weight of the monomer mixture, can be used. The polymer molecular weight can be controlled by other techniques known in the art, such as selecting the ratio of initiator to monomer.

Catalyst and/or chain transfer agent can be dissolved or dispersed in separate or the same fluid medium and gradually added to the polymerization vessel. Monomer, either neat or dissolved or dispersed in a fluid medium, can be added simultaneously with the catalyst and/or the chain transfer agent. Amounts of initiator or catalyst can be added to the polymerization mixture to "chase" residual monomer after polymerization has been substantially completed to polymerize the residual monomer as is well known in the polymerization arts.

Aggregation of polymeric latex particles is typically discouraged by including a stabilizing surfactant in the polymerization mix. In general, the growing latex particles are stabilized during emulsion polymerization by one or more surfactants such as an anionic or nonionic surfactant, or a mixture thereof, as is well known in the polymerization art. Many examples of surfactants suitable for emulsion polymerization are given in *McCutcheon's Detergents and Emulsifiers* (MC Publishing Co., Glen Rock, N.J.), published annually. Other types of stabilizing agents, such as protective colloids, can also be used. However, it is preferred that the amount and type of stabilizing surfactant or other type of stabilizing agent employed during the polymerization reaction be selected so that residual stabilizing agent in the aqueous product of the polymerization reaction does not significantly interfere with the subsequent opacity improvement of the process of the present invention. Further, charged initiator fragments and copolymerized monomer bearing charged functional groups such as copolymerized acid-functional monomers are known to contribute to the stability of the resulting polymeric latex particles. It is important to note that stabilizing surfactants, copolymerized strongly acidic monomers, residual initiator fragments, and the like, may also interfere with the subsequent opacity improvement of the process of the present invention. Thus adjusting polymerization conditions to provide a desired level of residual initiator fragments and surface acid may be very important in providing polymeric latex particles for use in the process of the present invention.

The polymeric latexes useful in the process of the present invention can be prepared from a wide range of polymerizable monomers, such as, for example, monoethylenically unsaturated monomers, including alpha, beta-monoethylenically unsaturated monomers such as alkyl acrylates and methacrylates. By "acrylic polymeric latex" is meant a polymeric latex polymerized from monomers comprising substantially polymerizable monomers including the acryl group ($-COCH=CH_2$) or methacryl ($-COC(CH_3)=CH_2$) group, and specifically greater than about 80 weight percent (meth)acrylic monomers, based on the total monomer weight. Mixtures of polymeric latexes can also be used.

Examples of polymeric latexes which can be employed in the process of the present invention include those polymerized from ethylenically unsaturated monomers, such as alpha, beta -ethylenically unsaturated monomers, including styrene, butadiene, alpha-methylstyrene, vinyltoluene, vinylnaphthalene, ethylene, vinyl acetate, vinyl versarate, vinyl chloride, vinylidene chloride, acrylonitrile, methacrylonitrile, (meth)acrylamide, various ($C_1$-$C_{20}$)alkyl esters of (meth)acrylic acid; for example, methyl (meth)acrylate, ethyl (meth)acrylate, n-butyl (meth)acrylate, isobutyl (meth)acrylate, 2-ethylhexyl (meth)acrylate, cyclohexyl (meth)acrylate, n-octyl (meth)acrylate, n-decyl (meth)acrylate, n-dodecyl (meth)acrylate, tetradecyl (meth)acrylate, n-amyl (meth)acrylate, neopentyl (meth)acrylate, cyclopentyl (meth)acrylate, lauryl (meth)acrylate, oleyl (meth)acrylate, palmityl (meth)acrylate, and stearyl (meth)acrylate; other (methacrylates such as isobornyl (meth)acrylate, benzyl (meth)acrylate, phenyl (meth)acrylate, 2-bromoethyl (meth)acrylate, 2-phenylethyl (meth)acrylate, and 1-naphthyl (meth)acrylate; alkoxyalkyl (meth)acrylate such as ethoxyethyl (meth)acrylate; mono-, di-, and trialkyl esters of ethylenically unsaturated di- and tricarboxylic acids and anhydrides, such as ethyl maleate, dimethyl fumarate, trimethyl aconitate, and ethyl methyl itaconate. As used in the present specification and claims, "(meth)acrylate" denotes both "acrylate" and "methacrylate" and "(meth)acrylic" denotes both "methacrylic" and "acrylic." The ethylenically unsaturated monomer can also include at least one multi-ethylenically unsaturated monomer effective to raise the molecular weight and crosslink the polymer. Examples of multiethylenically unsaturated monomers that can be used include allyl (meth)acrylate, tripropylene glycol di(meth)acrylate, diethylene glycol di(meth)acrylate, ethylene glycol di(meth)acrylate, 1,6-hexanediol di(meth)acrylate, 1,3-butylene glycol di(meth)acrylate, polyalkylene glycol di(meth)acrylate, diallyl phthalate, trimethylolpropane tri(meth)acrylate, divinylbenzene, divinyltoluene, trivinylbenzene, and divinylnaphthalene.

In addition to those monomers which are "functional" in the sense of including one or more polymerizable ethylenically unsaturated groups, monomers which also include one or more additional functional groups can be used in preparing the polymeric latexes used in the process of this invention. An important class of these functional monomers is that made up of those polymerizable ethylenically unsaturated monomers having acidic functional groups. Examples of these include acrylic acid, methacrylic acid, beta-acryloxypropionic acid and higher monoacidic oligomers of acrylic acid, ethacrylic acid, alpha-chloroacrylic acid, alpha-vinylacrylic acid, crotonic acid, alpha-phenylacrylic acid, cinnamic acid, chlorocinnamic acid, beta-styrylacrylic acid, itaconic acid, and maleic acid.

The selected polymeric latex particles employed in the process of the present invention must be polymerized from monomer including at least one copolymerizable species including adsorption-inducing functional groups, such as dihydrogen phosphate ester-functional monomers. Examples of dihydrogen phosphate functional monomer include dihydrogen phosphate esters of an alcohol in which the alcohol also contains a polymerizable vinyl or olefinic group, such as allyl phosphate, allyl Cellosolve ® phosphate, mono- or diphosphate of bis(hydroxy-methyl) fumarate or itaconate, derivatives of (meth)acrylic acid esters, such as, for example, phosphates of hydroxyalkyl(meth)acrylates including 2-hydroxyethyl (meth)acrylate, such as Kayamer ® (trademark of Nihon Kayaku Co., Ltd.) PM-1, PM-2, PA-1, and PA-2 monomers, 3-hydroxypropyl (meth)acrylates, and the like. Examples of dihydrogen phosphate ester derivatives which can be employed include vinylbenzyl phosphates, and:

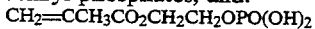
CH$_2$=CCH$_3$CO$_2$CH$_2$CH$_2$OPO(OH)$_2$

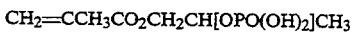
CH$_2$=CCH$_3$CO$_2$CH$_2$CH[OPO(OH)$_2$]CH$_3$

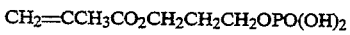
CH$_2$=CCH$_3$CO$_2$CH$_2$CH$_2$CH$_2$OPO(OH)$_2$

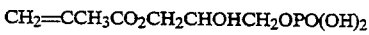
CH$_2$=CCH$_3$CO$_2$CH$_2$CHOHCH$_2$OPO(OH)$_2$

Other copolymerizable, adsorption-inducing monomers include copolymerizable phosphonate-functional monomers. Examples of copolymerizable phosphonate-functional monomers include 2-methacrylamido-2-methylpropanephosphonic acid, propene-2-phosphonic acid, and alpha-phosphonostyrene. Preferably, adsorption-inducing monomers which are highly copolymerizable and incorporated in the polymerized latex particles in the highest proportion are preferred. Thus, dihydrogen phosphate-functional monomers are presently preferred.

Thus, the present invention also provides aqueous dispersions, coating compositions, and pigment slurries including selected polymeric latex particles and titanium dioxide pigment particles, in which the selected polymeric latex particles are polymerized from monomer including at least one polymerizable dihydrogen phosphate-functional monomer selected from the dihydrogen vinylbenzyl phosphates, and
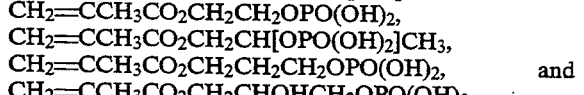
CH$_2$=CCH$_3$CO$_2$CH$_2$CH$_2$OPO(OH)$_2$,
CH$_2$=CCH$_3$CO$_2$CH$_2$CH[OPO(OH)$_2$]CH$_3$,
CH$_2$=CCH$_3$CO$_2$CH$_2$CH$_2$CH$_2$OPO(OH)$_2$, and
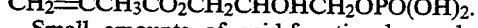
CH$_2$=CCH$_3$CO$_2$CH$_2$CHOHCH$_2$OPO(OH)$_2$.

Small amounts of acid-functional copolymerizable monomer, such as methacrylic acid and/or acrylic acid, are typically included in preparing polymeric latexes to confer colloidal stability. In a presently preferred embodiment of the present invention, as noted above, the selected polymeric latex employed is polymerized from monomer mixture including at least one phosphoric acid partial ester derivative of a (meth)acrylic acid ester, preferably including a dihydrogen phosphate monoester. Other types of copolymerizable functional monomers can also be included, depending on the ultimate application for which the product produced by the process of the present invention is intended. For example, small amounts of adhesion-promoting copolymerizable monomers can also be included. Examples of other types of functional monomers include hydroxy-functional monomers such as 2-hydroxyethyl (meth)acrylate, amino-functional monomers such as dimethylaminoethyl (meth)acrylate, epoxy-functional monomers, such as glycidyl methacrylate and the like. Examples of synthetic polymeric latexes which can be used include acrylic copolymer latexes, such as butyl acrylate/methyl methacrylate/acid and ethyl acrylate/methyl methacrylate/acid copolymer latexes; vinyl acetate homopolymer and copolymer latexes, including ethylene/vinyl acetate copolymer latexes; styrene/butadiene copolymer latexes; and the like.

While the chemical composition of a polymeric latex binder is important for achieving the resultant properties of the coating or film when the polymeric latex also acts as the binder, the glass transition temperature and amount of acid functionality in the polymeric latex can also be important for the purpose of the invention.

The particle size, particle size distribution, and molecular weight of the selected polymeric latex can be selected by the choice of a particular polymerization process, as for example through the use of particular initiator and chain transfer systems, as is well known in the polymerization arts. The average particle size and the molecular weight of the polymeric latex are important with regard to both the opacity improvement, as well as with respect to the properties of the polymeric latex when it is employed as a binder in the fully formulated aqueous composition.

Preferably, the selected polymeric latex used in the process of the present invention has an average particle diameter in the range of from approximately four times the average particle diameter of the titanium dioxide pigment particles down to about 20 nm. For example, if the titanium dioxide particles to be used have an average particle size of about 200 nanometers, the polymeric latex particle should have an average particle size in the range of from about 20 to less than about 800 nanometers. Hard polymeric latex particles, preferably having an average particle diameter of from about 50 nm to 80 nm, are preferred in one embodiment of this invention. Soft, selected polymeric latex particles preferably having a particle diameter or an average particle size less than about 135 nanometers are preferred in another, with an average particle size of about 105 nm being especially preferred in this embodiment. By "average particle size" or "average particle diameter" is meant an average determined experimentally by the quasielastic light scattering technique, such as provided, for example, by the Model BI-90 Particle Sizer, of Brookhaven Instruments Corp.

In a presently preferred embodiment of the invention, the particle size of the polymeric latex is adjusted to provide, at a predetermined level of pigment volume solids, a number ratio of polymeric latex particles to titanium dioxide particles sufficiently high so that the surface of each titanium dioxide particle can be effectively covered or saturated with adsorbed polymeric latex particles to form composite particles, thus reducing the likelihood of adsorbed polymeric latex "bridging" two or more titanium dioxide particles to form undesirable, viscosity increasing, aggregates and grit. Even when the titanium dioxide particles are "saturated" with adsorbed selected polymeric latex particles, the composite particles of this invention do not comprise "encapsulated" particles, in the sense of a continuous layer of polymer enveloping the surface of the titanium dioxide particle.

In the case in which the selected polymeric latex is used as the sole binder for a semi-gloss paint or a flat paint formulated at below the critical pigment volume concentration, a particle size of about 105 nm is preferred for the polymeric latex particles. It has been found that this particle size of allows successful formulation of semi-gloss and flat paints for most grades of titanium dioxide particles. Under these conditions, it is presently understood that this particle size provides sufficient numbers of binder particles so that the titanium dioxide particle surface is saturated, thereby preventing the bridging flocculation. If the PVC is raised too high, or if a second, non-adsorbing polymeric latex binder is substituted for some of the selected polymeric latex, some bridging flocculation and concomitant grit formation may result.

Dibasic phosphate can be provided by adding a water-soluble dibasic phosphate salt to the mixture of selected polymeric latex particles and titanium dioxide particles. Examples of water-soluble dibasic phosphate salts which can be employed include dibasic ammonium phosphate, dibasic sodium phosphate and dibasic potassium phosphate. Dibasic ammonium phosphate is especially preferred, as the pH of coatings compositions is often adjusted with ammonia. The evaporation of ammonia after application of the coating composition reduces the water sensitivity of the coating which might other,vise result from the presence of non-volatile salt counterions such as sodium or potassium. The dibasic phosphate can be prepared as an aqueous solution from phosphoric acid and ammonia, by dissolving solid dibasic ammonium phosphate in water, from a solution of monobasic ammonium phosphate, etc. Other sources of dibasic phosphate include polyphosphates such as pyrophosphates and hexametaphosphates.

Titanium dioxide pigment in available in various grades from several suppliers, with specific titanium dioxide grades being optimized by the supplier for intended end use application, such as for high gloss paints, for general purpose applications, and the like. Titanium dioxide particles can be prepared by either the chloride process or sulfate process, and the method of preparation may affect the physical and chemical properties of the products, including the surface properties. The titanium dioxide particles can be pretreated to provide inorganic surface coatings, such as coatings of silica, aluminum oxide, zirconium oxide, or mixtures of silica and aluminum oxide, on titanium dioxide particles. Similarly, proprietary organic coatings are sometimes employed by suppliers of titanium dioxide pigments.

In addition, small molecular species, such as silanes or titanates, can be adsorbed on and reacted with surface of the titanium dioxide particles, and the resulting surface sites can be subsequently modified chemically. Examples of such species include N-2-aminoethyl-3 -aminopropyltrimethoxysilane, 3-aminopropyltrimethoxysilane, 3-methacryloxypropyltrimethoxysilane, and vinyltriacetoxysilane. Alternatively, other species can be simply adsorbed to the surface of the titanium dioxide pigment particles. The most important examples of these are low molecular weight polyelectrolytes such as conventional pigment dispersants.

The practice of the process of the present invention depends on the specific grade of titanium dioxide employed. It is not presently understood what determines whether the present process can be employed, although it is believed that the surface characteristics of the titanium dioxide may be important. Nevertheless, whether the present process can be employed to yield improved coatings properties with respect to a specific grade of titanium dioxide can be readily determined empirically.

For some grades of titanium dioxide, it has been found that added dibasic phosphate advantageously functions as an adsorption promoter. In such cases it may be desirable to add the dibasic phosphate to either the titanium dioxide particle dispersion or the selected polymeric latex particle dispersion before they are mixed, or shortly after they are mixed, to increase the rate and/or extent of adsorption.

Generally, low levels of fairly weak dispersants are desirable in paints prepared by the process of the present invention. For example, 0.5% Tamol SG-1 or, alternatively, Tamol 1124 is preferred for a dry grade of titanium dioxide pigment, as it is presently believed that the selected polymeric latex particles must be able to compete effectively with the dispersant for adsorption to the surface of the titanium dioxide particles. Further, the ultimate stability of the paint is provided by the adsorbed selected polymeric latex particles, so high levels of dispersant are not needed. The dispersants employed in commercial titanium dioxide slurries are generally believed to be sufficient, and no additional pigment dispersants are believed required when slurry grade titanium dioxide particles are employed in the process of this invention. Conversely, use of high levels of high acid dispersants is believed to effectively block adsorption.

Examples of suitable anionic polyelectrolyte pigment dispersants for use in the process of the present invention include copolymers including copolymerized maleic acid, copolymers including copolymerized acrylic acid, copolymers including copolymerized methacrylic acid, and the like.

The presence of conventional polyelectrolyte dispersants has a significant effect on the opacity improvement of the present invention. While low concentrations of conventional water-soluble polyelectrolyte dispersants, on the order of about 0.5 weight percent or lower, have little adverse effect on the opacity improvement, the use of higher concentrations of these conventional water-soluble polyelectrolytes dispersants can have a significant adverse effect upon opacity. This is presently believed to be related to reduction in the adsorption of the polymeric latex particles on the titanium dioxide particles.

In some cases, it is possible to practice the process of the present invention without employing a pigment dispersant to disperse the titanium dioxide pigment particles, although in others it is generally preferred that a pigment dispersant be used.

The adsorption of polymeric latex particles on titanium dioxide pigment particles is presently believed to be a complex function of the type and level of adsorbing moiety on the titanium dioxide pigment particles surface, the surface treatment on the titanium dioxide pigment particle's surface, the pigment and binder surface area, the level and type of dispersants present in the mixture, the type of thickener used, the ionic strength of the mixture, and the presence or absence of other, competing molecules. Together, these factors are believed to determine the adsorption level, thereby affecting viscosity and viscosity stability, hiding, gloss, and block.

In one presently preferred embodiment of the present invention an emulsion polymerization process is used to prepare a polymeric latex from monomer mixture including one or more ethylenically polymerizable derivatives of phosphoric acid, such as one or more partial esters of phosphoric acid and 2-hydroxyethyl methacrylate. Examples of such partial esters are given above and include the monoester of phosphoric acid with hydroxyethyl methacrylate, the diester of phosphoric acid with hydroxyethyl methacrylate, and mixture thereof. The resulting phosphoric acid ester-functional polymeric latex particles result in improved opacity compared to polymeric latex prepared from monomer mixture which does not include phosphoric acid ester-functional monomer.

The process of the present invention can significantly increase the hiding of titanium dioxide containing emulsion paint formulations (as determined by measuring the scattering coefficient of the paint) of the same PVC compared with the scattering coefficient of a paint formulation prepared by the use of conventional polymeric latices. An alternate way of expressing this improvement is that the process of the invention permits the reduction of the PVC of a 20% PVC titanium dioxide paint formulation by as much as 20 percent or more while achieving the same scattering coefficient or degree of hiding as can be obtained by the use of a conventional polymeric latex.

Furthermore, the improved performance of paint formulations prepared by the present process is achieved even in the presence of substantial amounts of large particle size extenders, such as calcium carbonate and alumino silicate, typically employed in such formulations.

In addition, the improved hiding achievable by use of the process of this invention is realized when the coating formulation is prepared with conventional thickeners of the associative and non-associative types. This improvement is dependent upon the selected thickener. Because the hiding achievable using associative thickeners is often greater than that achievable using conventional thickeners such as hydroxyethylcellulose ("HEC") thickeners, a greater increase in hiding can often be achieved by employing the process of the present invention with a conventional thickener such as HEC than is achievable with an otherwise equivalent coatings formulation employing an associative thickener. However, both versions of coatings compositions thickened with cellulosic thickeners and the otherwise equivalent versions thickened with associative thickener show comparable levels of hiding when the present process is employed. Thus, when the process of the present invention is employed, the level of hiding tends to be independent of the type of thickener employed. This result is surprising and contrary to the result typically encountered when paints are formulated using conventional polymeric latices. In such conventional systems the hiding property of the formulated paint can vary greatly as a function of the thickener employed. The process of the invention therefore offers paint formulators a greater choice in selecting thickeners for the final paint formulation without concern over the choice of thickener adversely affecting the final hiding properties of the paint.

In some cases there appears to be a relationship between the type of thickener and type of pigment dispersant employed and the efficacy of adsorption. For example, if a conventional hydroxyethyl cellulose thicker is employed, it may be possible to employ a high acid pigment dispersant such as Tamol 731, whereas the same paints thickened with an associative thickener may not have adsorption. It has been observed that the level of thickener required in paints prepared according to the present invention is often substantially lower than that required for the conventional paints. It appears that the composite particle has a higher effective volume than the corresponding titanium dioxide particle, thus generally giving the paints higher viscosity. In addition, some loose association of the composite particles may contribute to the high viscosities sometimes observed.

Furthermore, in addition to improving the hiding of paint formulations, the process of this invention also has been found to advantageously improve the color acceptance, metal marring resistance, gloss, and high shear viscosity of paint formulations compared with paint formulations prepared with conventional polymeric latices, as well as improving the corrosion resistance of paint formulations.

In addition to the titanium dioxide particles, which are typically of relatively small particle size, on the order of 200–250 nm, other pigment particles, such as the large particle size extender pigment particle typically included in many types of coating formulation to reduce raw material costs, can also be employed in addition to the titanium dioxide pigment particles in the process of the present invention. Examples of large particle size extender pigment particles which can be used include calcium carbonate, alumino-silicate, amorphous silica, and the like.

It is preferred that extender grinds be added to the mixture of selected polymeric latex particles and titanium dioxide particles after it has stirred for an hour or so if possible. At least in some cases, addition of the extender grind prematurely, or grinding the extender with the titanium dioxide in a common grind, has been found to result in lower hiding, as it is believed that extra dispersant associated with the extender serves to impede adsorption. If it is desired to grind the extender in with the titanium dioxide grind or slurry, it is preferred that a dispersant level below 0.5% w/w be used, if possible.

Similarly, the aqueous medium in which the titanium dioxide particles are ground with the polymeric latex dispersant can also include water-miscible solvents, such as glycols and glycol ethers, such as are conventional in the coatings arts. Examples of water-miscible solvents employed include propylene glycol, ethylene glycol, ethylene glycol monomethyl ether, and the like.

Aqueous coating compositions are frequently formulated at alkaline pH to stabilize anionically charged latex binder against agglomeration and for other reasons. The principles of formulating aqueous coating compositions are reviewed, for example, in *Formulation of Organic Coatings* (N. I. Gaynes ed. D. Van Nostrad Co. Inc. Princeton, N.J. 1967) at pp. 189–230.

The present invention provides aqueous dispersions including selected polymeric latex particles and titanium dioxide pigment particles, which can be used in a variety of applications. In some cases, a "soft" (i.e. low effective glass transition temperature, such as on the order of −50° C. to 20° C.) polymeric latex can be added to the dispersion, typically with the further addition of other components, the soft polymeric latex serving as binder for the composition. Often the binder-forming latex polymer particles contain carboxyl functional groups. Under suitable conditions, the carboxyl groups are ionized and the resultant charges on the latex particle surface electrostatically stabilize the latex against premature agglomeration. Often a volatile base, typically ammonia, is used to adjust the pH of the coating composition. When the coating composition is applied to a substrate to be coated, the volatile base is lost and the pH of the coating composition drops, destabilizing the latex particles of the binder and thus encouraging agglomeration to form a continuous binder film.

In addition to binder-forming polymeric latex particles, selected polymeric latex particles, and titanium dioxide pigment particles, aqueous coating compositions prepared according to the process of the present invention can include typical coatings ingredients. For example, they can include extender pigments as noted above such as calcium carbonate, amorphous silica, and the like; defoamers; biocidal agents such as zinc oxide, 2-N-octyl-4-isothiazole-3-one, and phenyl mercuric acetate; coalescing agents such as diethylene glycol monoethyl ether acetate and ethylene glycol monobutyl ether acetate; plasticizers such as dialkyl phthalates including dibutyl phthalate, dioctyl phthalate and the like; freeze-thaw stabilizers such as ethylene glycol, propylene glycol and diethylene glycol; nonionic wetting agents such as polyethylenoxylates of fatty acids, alkanols, alkyl-phenols, and glycols; polyelectrolyte pigment dispersants; thickeners such as polyelectrolyte and cellulosic thickeners; rheology control agents such as associative thickeners and the like; colorants such as colored pigments and dyes; perfumes; cosolvents and the like.

With respect to the order of addition, it is preferred that the titanium dioxide pigment grind or slurry be added to the aqueous dispersion of the selected polymeric latex particles, rather than visa versa, so that situations in which there is a temporary "excess" of titanium dioxide particles relative to polymeric latex particles, and the possibility of grit formation through bridging flocculation of the polymeric latex particles by the excess of titanium dioxide particles, can be avoided. In addition, because paints prepared using composite particles tend to have higher effective volume solids than corresponding conventional paints, it is preferred that letdown ingredients of the paint, such as propylene glycol, excess water, and the like, be added to the aqueous dispersion of polymeric latex particles before adding the titanium dioxide grind or slurry, so that volume solids of the paint does not exceed a critical level during preparation.

The illustrative examples which follow illustrate the process of the present invention as a function of the parameters of the selected emulsion polymer. These examples will aid those skilled in the art in understanding the present invention; however, the present invention is in no way limited thereby. In the examples which follow, percentage composition is by weight, unless otherwise noted.

The following test methods were employed to evaluate the example compositions:

Adsorption was measured as follows: 4 grams of paint is diluted with 31 grams of a premix of Acrysol RM-1020, Acrysol RM-825, and water in a 50 ml centrifuge tube. The thickener premix is made from 7 grams of Acrysol RM-1020, .2 grams of Acrysol RM-825, and 130 grams of water, thereby mimicking the thickener level in the continuous phase of a typical paint. The paint is centrifuged for 60 minutes at 5000 RPM using a Sorvall SS-3 centrifuge. The supernatant and the two aliquots of water used to gently wash the hard pack are weighed. From the solids of the supernatant, the weight of the thickener in the dilution mixture, and the weights of the binder and $TiO_2$ in the original 4 gram paint sample, one then calculates the weight of the binder which is not in the supernatant and is, therefore, adsorbed. This calculation makes no correction for the soluble material in the paint, nor for the continuous phase (supernatant) in the hard pack. Neither of these corrections is believed to be large, however. Values are reported as milligrams binder adsorbed per gram of $TiO_2$(mg/g), measured at the times noted.

Hiding was measured using a method derived from ASTM D-2805-70 and modified to use standard glass plates. Triplicate drawdowns of thin films, and single drawdowns of thick films, were made.

Gloss was measured at 20 and 60 degrees using a method derived from ASTM D-523-89 using a Gloss-guard II glossmeter (Gartner/Neotec Corp.) on Leneta 5C charts coated with a drawdown made using a 3 mil Bird film applicator. Specimens were mounted on a flat, solid surface before measurement.

Grit was evaluated by eye and under a low-power (Bausch and Lomb 10x) optical microscope.

Equilibrated KU viscosity (low shear viscosity) was measured using a method derived from ASTM D-562-81. The equilibrated value was generated at the time the heat-aged, freeze-thaw, and roller stability samples were measured. Values are reported as hand-sheared (HS), and sheared with a stirrer for 2 minutes (SH).

Equilibrated ICI viscosity (high shear viscosity) was measured using a method derived from ASTM D-3205-77. The equilibrated value was generated at the time the heat-aged, freeze-thaw, and roller stability samples were measured.

Equilibrated Brookfield viscosity was measured using a method derived from ASTM D-2196-68 using a Brookfield Viscometer Model LVT. The equilibrated value was generated at the time the heat-aged samples were measured, using spindle 4 at 60 rpm.

Heat age viscosity was measured using a method derived from ASTM D-562-55. Samples were heat-aged for 240 hours in a 140 degree F. oven. Values are reported as sheared KU (SHKU) and the sheared KU for the heat aged sample minus that for the equilibrated sample (delta SHKU). ICI values are similarly reported.

Syneresis on heat age was rated qualitatively for the amount of clear layer on top of the paint.

Freeze thaw stability was measured by subjecting samples to a series of five freeze/thaw cycles. Values reported are sheared KU (SHKU), and the sheared KU for the freeze thaw sample, minus that for the equilibrated sample (delta SHKU). Paints were checked after each cycle to make sure they were still fluid. Viscosities were measured after 5 cycles.

Scrub resistance was measured using a method derived from ASTM D-2486-74A: The point at which the first portion of the chart was visible (First Cut) and the point at which one full line of chart was visible across the width of the shim (First Line) were noted. The scrub test was discontinued at this point.

Adhesion and blister resistance were measured using a method derived from ASTM D 246-74A. Two coats, brushed on 4 hours apart, were applied to the alkyd (Duron Green), chalky acrylic, and chalky oil boards. The boards were allowed to dry 1 and 7 days before being placed in the fog box. The boards were rated for blister after 1 and 5 hours in the fog box. Adhesion was tested by the cross hatch (XH) and the knife peel (KP) methods after 5 hours in the fog box.

Example A

A typical conventional 20% PVC gloss paint (Comparative Example A) was prepared according to the following formulation: Pigment grind:

| Components | Weight (g) |
|---|---|
| water | 30 |
| propylene glycol | 20 |
| Colloid TM 643 defoamer | 1 |
| Tamol ® 731 dispersant (25% solids) | 8.19 |
| Ti-Pure ® R-900 titanium dioxide | 204.72 |

Colloid is a trademark of Rhone-Poulenc Corp. Tamol 731 is a sodium salt of polymeric carboxylic acid, a polycarboxylate dispersant (Tamol is a trademark of Rohm and Haas Company). Ti-Pure is a trademark of Du Pont de Nemours Co. Ti-Pure R-900 is a coatings grade of rutile titanium dioxide. These components were milled on a high speed disk disperser to form a pigment grind, and were let down at a slower speed with the following:

| Components | Weight (g) |
|---|---|
| Rhoplex ® AC-61 polymer latex | 493.75 |
| Colloid 643 defoamer | 4 |
| Texanol ® coalescent | 22.96 |
| Triton ® GR-7M surfactant | 2 |
| propylene glycol | 59 |
| Nuosept ® 95 preservative | 6 |
| water and Natrosol ® 250 MR cellulosic thickener | 165.07 |

Rhoplex is a trademark of Rohm and Haas Company. Texanol is a trademark of Eastman Kodak Co. Triton is a trademark of Union Carbide Company. Nuosept is a trademark of Nuodex, Inc. Natrosol is a trademark of Hercules, Inc. The mix is thickened to a Stormer viscosity of 80 KU by addition of an aqueous solution of the cellulosic thickener, and the pH of the mix is adjusted to 9 by addition of ammonia.

To provide Example A, the paint formulation process of Comparative Example A was repeated replacing the 493.75 g of Rhoplex AC-61 with a mixture of 419.66 g Rhoplex AC-61 (46.5% solids) and 92.04 g of a polymeric latex having a glass transition temperature of 65° C., a particle size of 71 nm, and having 6% phosphoethyl methacrylate (Latex A, 37.4% solids). The total weight of water was adjusted to maintain the same total solids in the final paint. Kubelka-Munk scattering coefficients were determined for all paints using a modification of ASTM D 2805-70.

Results are given in Table I.

TABLE I

| Example | Dispersant | Binder | Scattering Coefficient |
|---|---|---|---|
| Comp. A | 1% Tamol 731 | AC-61 | 7.26 |
| A | 1% Tamol 731 | AC-61/Latex A | 7.77 |

The results in Table I demonstrate that a polymeric latex with phosphoethyl methacrylate (Example A) when blended with a conventional latex will result in improved opacity compared to a conventional latex alone as reflected by the Kubelka-Munk scattering coefficients.

Example B

An acrylate polymeric latex emulsion was prepared having a calculated glass transition temperature of about 14° C., a particle size of 161 nm, and total solids of about 45 percent by weight using a single-stage, gradual-addition thermal process from monomer including 1.3 percent by weight methacrylic acid and one percent by weight phosphoethyl methacrylate (Latex B). A pigment grind was prepared by grinding together at high speed 200 parts by weight Ti-Pure R-900 titanium dioxide, 8 parts by weight Tamol 731 pigment dispersant, 1 part by weight Colloid 643 defoamer, 20 parts by weight propylene glycol and 30 parts by weight water. 495.6 parts by weight of Latex B were mixed at low speed with 7.57 parts by weight water and 22.64 parts by weight Texanol. Subsequently, to the Latex B/Texanol mixture were added 9.70 parts by weight Triton X-405 surfactant, 49.57 parts by weight water, 4 parts by weight Colloid 643 defoamer, 59 parts by weight propylene glycol, and 6 parts by weight Nuosept 95 preservative. To this mixture was added the grind, and subsequently, 100.4 parts by weight of a 5.0 percent by weight solution of Natrosol 250 MR hydroxycellulose thickener were added to provide a paint (Example B) with a PVC of 20 percent, a calculated volume solids of 32 percent, and a calculated weight solids of 42.1 percent. The hiding and gloss of the paint were evaluated and compared with a control paint prepared from an polymeric latex made using a similar process but omitting the phosphoethyl methacrylate (Comparative Example B), the results being given in Table II, and showing improved hiding and gloss using the process of the present invention.

TABLE II

| Example | Hiding | 20° Gloss | 60° Gloss |
|---|---|---|---|
| Comp. B | 6.9 | 14 | 54 |
| B | 7.8 | 24 | 63 |

To 1300 g of deionized water stirred under a nitrogen atmosphere at 85° C. was added 4 g of ammonium persulfate in 24 g of deionized water and 60 g of a seed latex. A monomer emulsion prepared from 600 g of deionized water, 28 g of Siponate DS-4,900 g of butyl acrylate, 876.6 g of methyl methacrylate and 23.4 g of methacrylic acid was added over a 200 minute period along with 2 g of ammonium persulfate in 100 g of deionized water maintaining 85° C. When the reaction was complete, the dispersion was cooled and filtered. The product (Latex C) had 45.6% solids and pH 3 with an average diameter of 196 nm.

The process used to prepare Latex C was repeated, except that 18 g of the methyl methacrylate was replaced with an equal weight of Kayamer (trademark of Nihon Kayaku Co. Ltd.) PM-1 (monomer mixture containing around 52% of the monoester of hydroxyethyl methacrylate and phosphoric acid and 33% of the diester). The product (Latex D) had 46.1% solids and pH 2.6 with an average particle size of 185 nm.

A tinted titanium dioxide dispersion was prepared from 180 g of deionized water, 7.2 g of Tamol 731 dispersant (25% solids), 3.0 g of Nopco NXZ defoamer, 600 g of Ti-Pure R-902 and 30 g of Colortrend lamp black dispersion. Samples of Latex C and Latex D were adjusted to pH 9 with 28% aqueous ammonia and used to formulate paints with 14% PVC of Ti-Pure R-902 pigment (Comparative Example C and Example C): To 29.5 g of R-902 dispersion was added 7.8 g of water, 83.9 g of the pH 9 Latex C, 2.6 g of Texanol coalescent, 7.2 g of propylene glycol and 24.0 g of 2.5% aqueous Natrosol 250 MR hydroxyethyl cellulose thickener. Latex D was formulated similarly only 82.8 g were required and 8.9 g of water. The two paints were allowed to equilibrate for seven days and then their Y-reflectance was measured using a 45°/0° reflectometer (Colorguard, Gardner Instruments). From light scattering theory, the ratio of the scattering coefficient, S, and the adsorption coefficient, K, is given by:

$$S/K = 2R/(1-R)^2$$

where R is the reflectance from an infinitely thick layer of dry paint film. At a given titanium dioxide PVC, differences in Y-reflectance of equally tinted paint films arise solely from differences in titanium dioxide scattering efficiency. Titanium dioxide dominates the scattering while the tinting agent dominates the adsorption which can then be considered constant. The percentage difference in scattering coefficient exhibited by two equally tinted paints is then given by:

$$((S2-S1)/S1) \times 100 = ((R2(1-R1)^2/R1(1-R2)^2) - 1) \times 100$$

Results are given in Table III.

TABLE III

| Example | Latex | Y-Reflectance |
|---------|-------|---------------|
| Comp. C | C     | 0.504         |
| c       | D     | 0.540         |

These results show that the phosphate-containing binder (Latex D) results in increased Y-reflectance compared to standard binder (Latex C) corresponding to an increase in scattering efficiency of the titanium dioxide in the dry paint film of 25%.

EXAMPLE 1-8

A typical conventional 20% PVC semi-gloss paint (Example 2) was prepared according to the following formulation.

A premix was prepared by mixing 11.34 g Triton® X-405 nonionic surfactant, 26.40 g Texanol® (Texanol is a trademark of Eastman Kodak Co.) coalescent, 4.01 g Colloid 643 defoaming agent, 65.11 g propylene glycol, and 6.01 g Nuosept® (Nuosept is a trademark of Nuodex, Inc.) 95 preservative, and the premixed was blended into 576.5 g of an aqueous dispersion of an acrylic polymeric latex (45.8 percent by weight solids) having an average particle size of 107 nanometers and prepared by emulsion polymerization of a monomer mixture including a copolymerizable dihydrogen phosphate functional monomer (Latex E). This was followed by adding 19.8 g water. 306.7 g Ti-Pure® R-942 (Ti-Pure is a trademark of Du Pont de Nemours Co.) titanium dioxide slurry was measured out and slowly mixed into the polymeric latex dispersion. Subsequently, 17.03 g Acrysol® RM-1020 rheology modifier, 8.84 g water, and 0.88 g aqueous ammonia (28 percent by weight) were added to provide a paint composition (Example 2) having a calculated pigment volume concentration of 20.0 percent, a calculated volume solids of 36.5 percent, and a calculated weight solids of 49.6 percent. Acrysol is a trademark of Rohm and Haas Company.

The above process was repeated, except that 19.8 g of a ten percent by weight aqueous solution of dibasic ammonium phosphate (diammonium hydrogen phosphate, CAS Reg. No. 7783-28-0) was substituted for the water added after the premix, to give the paint of Example 1.

Similarly, Examples 3 and 4 were prepared by substituting the same weight of ten percent by weight aqueous solutions of ammonium sulfate and ammonium benzoate respectively. Example 5 was prepared by waiting until after the slurry, binder and premix (without thickener) had been mixed for one and one-half hours at low speed before adding the dibasic ammonium phosphate solution rather than adding immediately after the premix. Thickener was then added. Similarly, Examples 6, 7, and 8 were prepared by substituting water, the aqueous ammonium sulfate solution, and aqueous ammonium benzoate, respectively, for the dibasic ammonium phosphate solution employed in Example 5. Low shear viscosities were measured periodically using a Stormer viscometer after mechanically stirring the paints for about 2 minutes at moderate speed and are reported in Krebs units. High shear viscosities were measured using a cone-and-plate ICI viscometer. The results are given in Table A, along with the results of periodic viscosity measurements. These results show that addition of dibasic ammonium phosphate (Examples 1 and 5) inhibits adsorption compared to the controls (Examples 2 and 6) while sulfate (Examples 3 and 7) and benzoate (Examples 4 and 8) each enhance adsorption.

TABLE A

|                       | Example 1 | Example 2 | Example 3 | Example 4 |
|-----------------------|-----------|-----------|-----------|-----------|
| Adsorption (mg/g)     |           |           |           |           |
| 4–6 hours             | 120       | 270       | 340       | 320       |
| 5 days                | 156       |           |           |           |
| 12 days               | 146       |           |           |           |
| Viscosity (KU/ICI)    |           |           |           |           |
| 20 minutes            | 80/1.15   | 87/1.20   | 94/1.45   | 88/1.35   |
| 5–6 hours             | 85/1.25   | 92/1.42   | 98/1.65   | 95/1.50   |
| 1 day                 | 88/1.28   | 96/1.50   | 101/1.70  | 98/1.63   |
| 5 days                | 89/1.35   | 98/1.62   | 102/1.75  | 99/1.70   |
| 12 days               | 89/1.40   | 97/1.64   |           |           |

|                       | Example 5 | Example 6 | Example 7 | Example 8 |
|-----------------------|-----------|-----------|-----------|-----------|
| Adsorption (mg/g)     |           |           |           |           |
| 4–6 hours             | 300       | 290       | 360       | 330       |
| 1 day                 | 292       | 326       | 386       | 357       |
| 5 days                | 274       | 321       | 380       | 359       |
| Viscosity (KU/ICI)    |           |           |           |           |
| 20 minutes            | 94/1.40   | 91/1.32   | 94/1.45   | 91/1.45   |
| 5–6 hours             | 93/1.42   | 91/1.40   | 99/1.60   | 95/1.45   |
| 1 day                 | 95/1.43   | 95/1.48   | 101/1.70  | 97/1.65   |
| 5 days                | 95/1.45   | 98/1.60   | 102/1.75  | 99/1.70   |
| 12 days               | 94/1.50   | 96/1.64   | 100/1.85  | 99/1.78   |

The process of Examples 1 and 5 was repeated to prepare Examples 9 and 10, respectively. Example 11 was prepared by the same process as Example 2. In Examples 9 and 11, the dibasic ammonium phosphate and water were added in the premix. Comparative Example 1 was prepared according to the process of Example 6, except that a sufficient amount of a twenty-five percent by weight aqueous solution of Tamol® (Tamol is a trademark of Rohm and Haas Company) 731 polycarboxylate dispersant sufficient to provide one percent dispersant solids by weight on titanium dioxide solids was added after the paint had been mixed for one and one-half hours. Comparative Example 2 is a semi-gloss paint control based on a commercial acrylic polymeric latex binder. The adsorption and viscosity stability of Examples 9-11 and Comparative Examples 1 and 2 were measured as above and are reported in Table B. In addition, the freeze-thaw stabilities were measured by monitoring viscosity after five freeze-thaw cycles, and a number of paint performance properties, including hiding, gloss (20°/60°), grit, and adhesion and blistering over alkyd, as well as the viscosity, polymer latex adsorption, hiding and gloss after heat aging samples for 10 days at 60 degrees Celsius, were measured using the methods given above and are also reported in Tables B and C. These results show that the dibasic ammonium phosphate controls viscosity development to provide paints comparable in many key application performance properties to commercial materials while also providing enhanced gloss and hiding.

TABLE B

|  | Example 9 | Example 10 | Example 11 | Comp. Ex. 1 | Comp. Ex. 2 |
|---|---|---|---|---|---|
| Adsorption (mg/g) | | | | | |
| 1 day | 80 | 221 | 237 | 301 | |
| 5 days | 78 | 263 | 232 | 292 | |
| Viscosity (KU/ICI) | | | | | |
| 10 minutes | 83/1.25 | 91/1.41 | 86/1.28 | 90/1.30 | 94/1.40 |
| 1.5 hours | 84/1.20 | | 89/1.30 | 91/1.33 | 97/1.38 |
| 4 hours | 83/1.22 | 90/1.39 | 91/1.35 | 93/1.45 | 95/1.40 |
| 7 hours | 83/1.25 | | 93/1.41 | 94/1.41 | 96/1.40 |
| 1 day | 86/1.25 | 90/1.41 | 96/1.45 | 97/1.51 | 96/1.41 |
| 2 days | 88/1.25 | 90/1.42 | 98/1.55 | 97/1.55 | 97/1.41 |
| 5 days | 85/1.28 | | 98/1.58 | 98/1.67 | 96/1.45 |
| 1 week | 85/1.30 | | 97/1.65 | 101/1.70 | 95/1.41 |
| 2 week | 86/1.31 | 93/1.45 | 105/1.75 | 104/1.75 | 96/1.49 |
| Hiding | 7.7 | 8.2 | 8.4 | | 6.6 |
| Gloss (20/60) | 25/63 | 25/62 | 24/62 | 27/63 | 18/59 |
| Grit | trace | trace | trace | | trace |
| Heat aged samples: | | | | | |
| Viscosity | 86/1.45 | 93/1.62 | 93/1.67 | 93/1.69 | 101/1.48 |
| Adsorption | 55 | 179 | 319 | 371 | |
| Hiding | 7.8 | 8.1 | 8.4 | | 6.4 |
| Gloss | 34/70 | 33/69 | 30/66 | | 22/63 |
| Freeze-thaw samples: | | | | | |
| Stormer viscosity | | | 102 | | 99 |
| ICI viscosity | | | 1.75 | | 1.58 |

TABLE C

|  | Example 9 | Example 10 | Example 11 | Comp. Ex. 1 | Comp. Ex. 2 |
|---|---|---|---|---|---|
| Alkyd Blister (8 week old board) | | | | | |
| 1 day dry, 1 hour | 10 | 10 | 10 | 10 | 10 |
| 1 day dry, 5 hour | 10 | 10 | 10 | 10 | 10 |
| 7 days dry, 1 hour | 10 | 10 | 10 | 10 | 10 |
| 7 days dry, 5 hour | 10 | 10 | 10 | 10 | 10 |
| Alkyd Adhesion (8 week old board) | | | | | |
| 1 day dry, 5 hour (XH/KP) | 10/2 | 10/5 | 7/0 | 4/0 | 9.9/5 |
| 7 days dry, 5 hour (XH/KP) | 10/7 | 10/7 | 10/8 | 10/8 | 10/8 |
| Alkyd Blister (11 week old board) | | | | | |
| 1 day dry, 1 hour | 10 | 10 | 10 | 10 | 10 |
| 1 day dry, 5 hour | 10 | 10 | 10 | 8F | 10 |
| 7 days dry, 1 hour | 10 | 10 | 10 | 10 | 10 |
| 7 days dry, 5 hour | 10 | 10 | 10 | 10 | 10 |
| Alkyd Adhesion (11 week old board) | | | | | |
| 1 day dry, 5 hour (XH/KP) | 10/7 | 9.7/2 | 0/0 | 0/0 | 10/3 |
| 7 days dry, 5 hour (XH/KP) | 10/6 | 9.9/6 | 9.6/5 | 10/7 | 9.8/8 |

EXAMPLE 12-14

The processes of Examples 9-11 and Comparative Examples 1 and 2 were repeated to prepare Examples 12-14 and Comparative Examples 3 and 4, respectively, except that Ti-Pure R-742 titanium dioxide slurry was substituted for Ti-Pure R-942 titanium dioxide slurry. The adsorption and viscosity stability and various paint application and performance properties of Examples 9-11 and Comparative Examples 3 and 4 were measured as above and are reported in Tables D and E. These results show that the control of viscosity development by dibasic ammonium phosphate is not limited to a specific grade of titanium dioxide pigment, and that whether viscosity development can be controlled in this manner can be determined empirically.

face coatings, the pH of an aqueous dispersion (i.e. titanium dioxide in water), their oil adsorption values,

TABLE D

|  | Example 12 | Example 13 | Example 14 | Comp. Ex. 3 | Comp. Ex. 4 |
|---|---|---|---|---|---|
| Adsorption (mg/g) | | | | | |
| 1 day | −17 | 192 | 200 | 352 | |
| 7 days |  | 128 | 268 | | |
| 1 month | −50 | | 334 | 427 | |
| 5 weeks | −46 | 147 | 352 | | |
| Viscosity (KU/ICI) | | | | | |
| 10 minutes | 76/1.18 | 90/1.45 | 82/1.20 | 90/1.40 | 91/1.45 |
| 1.5 hours |  | 90/1.35 |  | 94/1.35 | 93/1.40 |
| 4 hours | 76/1.10 |  | 87/1.12 | 95/1.40 |  |
| 7 hours |  |  |  |  |  |
| 1 day | 77/1.10 | 86/1.41 | 95/1.41 | 100/1.50 | 95/1.45 |
| 2 days | 76/1.10 | 86/1.31 | 94/1.42 |  | 96/1.41 |
| 5 days | 79/1.10 | 89/1.30 | 105/1.51 | 105/1.60 | 100/1.53 |
| 1 week | 77/1.10 | 85/1.30 | 104/1.60 |  | 97/1.45 |
| 3 week | 78/1.10 | 86/1.32 | 106/1.78 | 108/1.80 | 98/1.50 |
| Hiding | 6 | 7.7 | 8.3 | 8.6 | 6.3 |
| Gloss (20/60) | 23.4/65.5 | 32.5/70.9 | 35.4/71.7 | 36.9/71.6 | 26.3/67.9 |
| Grit | trace | trace | trace | trace | trace |
| Heat aged samples: | | | | | |
| Viscosity | 88/1.38 | 103/1.80 | 110/2.10 | 114/2.10 | 107/1.60 |
| Adsorption | −3 | 244 | 403 | 657 | |
| Hiding | 7.1 | 8 | 8.1 | 8.5 | 7.1 |
| Gloss | 43.8/79.2 | 39.5/74.8 | 35.5/70.0 | 43.2/74.9 | 23.2/64.6 |
| Syneresis | severe | very slight | severe | severe | severe |
| Freeze-thaw samples: | | | | | |
| Stormer viscosity |  |  | 109 | 101 | |
| ICI viscosity |  |  | 1.72 | 1.62 | |

TABLE E

|  | Example 12 | Example 13 | Example 14 | Comp. Ex. 3 | Comp. Ex. 4 |
|---|---|---|---|---|---|
| Alkyd Blister (8 week old board) | | | | | |
| 1 day dry, 1 hour | 10 | 10 | 10 | 10 | 10 |
| 1 day dry, 5 hour | 10 | 10 | 10 | 10 | 10 |
| 7 days dry, 1 hour | 10 | 10 | 10 | 10 | 10 |
| 7 days dry, 5 hour | 10 | 10 | 10 | 10 | 10 |
| Alkyd Adhesion (8 week old board) | | | | | |
| 1 day dry, 5 hour (XH/KP) | 10/3 | 9.8/5 | 9/2 | 4/0 | 9.8/3 |
| 7 days dry, 5 hour (XH/KP) | 10/7 | 10/7 | 10/8 | 10/7 | 9.8/7 |
| Alkyd Blister (11 week old board) | | | | | |
| 1 day dry, 1 hour | 10 | 10 | 10 | 10 | 10 |
| 1 day dry, 5 hour | 10 | 10 | 10 | 8F | 10 |
| 7 days dry, 1 hour | 10 | 10 | 10 | 10 | 10 |
| 7 days dry, 5 hour | 10 | 10 | 10 | 10 | 10 |
| Alkyd Adhesion (11 week old board) | | | | | |
| 1 day dry, 5 hour (XH/KP) | 9/1 | 1/0 | 0/0 | 0/0 | 9/1 |
| 7 days dry, 5 hour (XH/KP) | 10/5 | 10/4 | 9.5/5 | 9.8/5 | 6/4 |

Examples 15–30

A number of different grades of titanium dioxide are listed in Table F along with their key physical and chemical properties, including the identity of their surface coatings, the pH of an aqueous dispersion (i.e. titanium dioxide in water), their oil adsorption values, median particle size in microns, whether they were prepared by the chloride or the sulfate process, and the weight percent titanium dioxide in the commercial product.

TABLE F

| Titanium dioxide Grade | Coating | pH | Oil Abs | Median ps | TiO$_2$ process | % TiO$_2$ |
|---|---|---|---|---|---|---|
| DRY GRADES: | | | | | | |
| TiPure R-700 | Al/org | 7.3 | 12.5 | .27 | Chloride | 97 |
| TiPure R-900 | Al | 9.5 | 16 | .31 | Chloride | 94 |
| TiPure R-902 | Al/Is | 8.7 | 17 | .32 | Chloride | 91 |
| TiPure R-960 | Al/high Is | 7.4 | 18 | .34 | Chloride | 89 |
| Tiona RCL-535 | Al/(org?) | 7–9 | 14–18 | | | 95 |
| Tioxide R-HD2 | Al/org | | 20 | | Sulfate | 94.5 |

TABLE F-continued

| Titanium dioxide Grade | Coating | pH | Oil Abs | Median ps | TiO$_2$ process | % TiO$_2$ |
|---|---|---|---|---|---|---|
| Tioxide R-HD6X | Al/org |  | 18 | .22 |  | 95 |
| Tioxide TR-92 | Al/Zr/org |  | 18 | .23 |  | 93.5 |
| Titanox 2101 | Al/Si |  | 20 |  | Sulfate | 92 |
| SLURRY GRADES |  |  |  |  |  |  |
| R-942 (slurry 902) | Al/Si | 8.7 | 17 | .32 | Chloride | 91 |
| RCS-535 (slurry 535) | Al/(org?) | 7–9 | 14–18 |  |  | 95 |
| RCS-9 (slurry RCL-9) | Al | 6.5–8.5 |  |  |  | 94 |
| R-HD6X slurry | Al/org |  | 18 | .22 |  | 95 |
| Kronos 4102 (slurry 2102) | Al/Zr | 7–8.3 | 16 |  |  | 94 |

Tioxide is a trademark of Tioxide, Inc. Titanox is a trademark of Kronos, Inc. Tiona is a trademark of SCM Chemicals. Kronos is a trademark of Kronos, Inc.

Semi-gloss dry grade paints were prepared using the process of the present invention, the above titanium dioxide pigments, and the following formulation:

| Components | Weight (g) |
|---|---|
| Polymeric acrylic latex F (47.2% solids) | 492.60 |
| Triton ® X-405 nonionic surfactant | 9.96 |
| Ropaque ® OP-62 opaque polymer pigment | 28.80 |
| Texanol ® coalescent | 22.96 |
| Foamaster TM VL defoamer | 1.00 |
| water | 125.4 |
| Acrysol ® RM-825 rheology modifier/thickener | 0.50 |
| Acrysol RM-1020 rheology modifier/thickener | 28.40 |
| water | 9.8 |

Foamaster is a trademark of Henkel Corp. Acrysol is a trademark of Rohm and Haas Company.

The following order of addition was employed for the above components: First, the Ropaque OP-62 opaque polymer pigment was mixed with the selected polymeric latex, latex F, followed by a premix of water, Triton X-405 nonionic surfactant, Texanol coalescent, and Foamaster VL defoamer. Next to be added was the pigment grind, prepared by grinding the respective titanium dioxide in a high speed disperser for 20 minutes in the following mixture:

| Components | Weight (g) |
|---|---|
| water | 12 |
| propylene glycol | 65 |
| Foamaster VL defoamer | 1 |
| Tamol ® SG-1 dispersant (35% solids) | 3.65 |
| titanium dioxide | 204.72 |

Tamol SG-1 is a polymeric dispersant which does not have a high level of acid functionality in comparison with "strong" dispersants.

After mixing for about ten minutes, the rheology modifiers/thickeners and a small quantity of water to adjust the total solids are added. In the case of "immediate addition" DAP paints, 17.44 g of 10 percent w/w DAP was substituted for 17.4 g of the initial water. In the case of "delayed addition" DAP paints, the same amount was added after the premix, binder, opaque polymer, and titanium dioxide have been mixed for one and one-half hours. The resulting paints had a calculated pigment volume concentration of 27.4%, a calculated volume solids of 34.0%, and calculated total solids on a weight basis of 47.0%.

Semi-gloss slurry grade paints were prepared using the process of the present invention, the above titanium dioxide pigments, and the following formulation:

| Components | Weight (g) |
|---|---|
| Polymeric acrylic latex F (47.2% solids) | 492.60 |
| Triton ® X-405 nonionic surfactant | 9.96 |
| premix: |  |
| Kathon LX 1.5 preservative | 1.80 |
| propylene glycol | 64.93 |
| water | 47.95 |
| Texanol ® coalescent | 24.28 |
| titanium dioxide slurry (76.5% w/w solids) | 330.47 |
| Ropaque ® OP-62 opaque polymer | 28.77 |
| Mix 1.5 hours and then add: |  |
| dibasic ammonium phosphate (10% w/w) | 17.44 |
| Foamaster VL defoamer | 2.00 |
| Acrysol RM-1020 rheology modifier/thickener | 18.91 |
| water | 16.09 |

The order of addition of the components was in the order given above, and one and one-half hours elapsed between addition of the pigment slurry and the aqueous dibasic ammonium phosphate solution.

Dry grade paints were made first from 0.5% Tamol SG-1 grinds with no DAP in the formulation. If a high KU viscosity problem was immediately evident, a paint was made by adding 0.69% DAP (w/w on the titanium dioxide) prior to mixing the grind in. If no viscosity problem was immediately evident, a "SG-1/DAP" paint was made adding the DAP 1.5 hours after the grind and binder were first mixed together. If the SG-1 paints proved inadequate, as judged by a gradual upwards drift in viscosity, the process was repeated with 0.5% Tamol 1124 dispersant, a "stronger" dispersant than Tamol SG-1, substituted in the grind. If in turn the Tamol 1124 paints proved inadequate, the process was repeated with a mixture of 0.5% citric acid and 0.05% Tamol 731 dispersant, substituted in the grind. The process with the slurry formulations was simpler, in that none of the slurry formulations showed any viscosity problems, Therefore, two paints were made with each slurry: one with no DAP and one with DAP added after 1.5 hours. Thickener levels were adjusted to give roughly an 85-105 KU initial viscosity and water was added to provide constant volume solids. Dry and slurry grade controls were prepared using conventional formulations.

The formulated paints were each compared to a respective control paint prepared using a commercial acrylic latex semi-gloss binder, Rhoplex ® SG-10M, in regard to hiding, gloss, room temperature viscosity stability, and room temperature syneresis. Rhoplex is a trademark of Rohm and Haas Company. The results of these evaluations are given in Table G.

TABLE G

| Example | Grade | Dispersant | DAP addn. | Hiding increase | Gloss increase | Syneresis | Thickener efficiency | Viscosity stability |
|---|---|---|---|---|---|---|---|---|
| | DRY GRADES: | | | | | | | |
| 15 | DuPont R-700 | SG-1 | 1.5 hours | +2% | +6 | ++ | + | good |
| 16[1] | DuPont R-900 | citric acid | immediate | +10% | −6 | = | + | good |
| 17 | DuPont R-902 | SG-1 | none | +6% | +11 | ++ | + | good |
| 18 | DuPont R-960 | 1124 | immediate | +4% | +0 | + | + | good |
| 19 | Tiona RCL-535 | SG-1 | none | +7% | +18 | ++ | + | good |
| 20 | Tioxide R-HD2 | 1124 | 1.5 hours | +5% | +6 | + | = | marginal |
| 21 | Tioxide R-HD6X | SG-1 | 1.5 hours | +8% | +13 | ++ | + | good |
| 22 | Tioxide TR-92 | citric acid | immediate | +17% | +14 | ++ | + | good |
| 23 | Titanox 2101 | 1124 | 1.5 hours | +10% | +0 | = | + | good |
| | SLURRY GRADES: | | | | | | | |
| 24 | TiPure R-942 (slurry 902) | none | 1.5 hours | +31% | +15 | + | + | good |
| 25 | Tioxide RCS-535 (slurry 535) | none | 1.5 hours | +14% | +16 | + | + | good |
| 26 | Tioxide RCS-9 (slurry RCL-9) | none | 1.5 hours | +20% | +17 | + | + | fair |
| 27 | Tioxide R-HD6X slurry | none | 1.5 hours | +7% | +18 | = | + | good |
| 28 | Kronos 4102 (slurry 2102) | none | 1.5 hours | +0% | +0 | − | + | good |

[1]Example 16 and its control were prepared using a formulation which did not include opaque polymer. The polymeric latex binders were similar but not identical to those used in he other examples of this table.

Of the fourteen grades of titanium dioxide tested, formulations with acceptable increases in viscosity on equilibration (<5 KU change between 1 day and 1 week readings, with less than 0.3 units change in ICI) were found for 13 of the grades. Of those 13 grades, all but two had significant hiding increases, ranging from 4% (R-960) to 31% (R-942) Accompanying these increases in hiding were 20° gloss increases of as much as 18 points and increases in 60° gloss of as much as 22 points. In addition, room temperature syneresis was improved in 10 of the 14 grades tested. Results were especially good with the slurry grades. In general, excellent results with the slurry grades were obtained when no dispersant was added to the slurry. With the dry grades, 0.5% dispersant was adequate, with Tamol 1124 or citric acid dispersant sometimes providing additional room temperature viscosity stability. The effect of DAP on adsorption varied, but it was generally beneficial in the formulation. However, in some cases it was more effective if added initially and in others it was more effective if added after the titanium dioxide particles and the selected polymer latex particles had been mixed for at least an hour or so.

There was little apparent variability of the hiding performance of the Tamol SG-1 dispersed dry titanium dioxide grades and the slurry grades when used with the selected polymer latex, Latex F. Thus the present invention advantageously provides a means of ensuring that performance differences between different types of titanium dioxide, dispersions of titanium dioxide (dry ground versus slurry), and lots of titanium dioxide are minimized.

Various modifications can be made in the details of the various embodiments of the compositions and processes of the present invention, all within the spirit and scope of the invention as defined by the appended claims.

We claim:

1. A process for preparing an aqueous dispersion including selected polymeric latex particles and titanium dioxide pigment particles and for controlling the adsorption of the selected polymeric latex particles on the titanium dioxide particles, the process comprising:

a) dispersing titanium dioxide pigment particles in a first aqueous medium;
   b) preparing a dispersion or suspension of selected polymeric latex particles in a second aqueous medium, the selected polymeric latex particles having at least one dihydrogen phosphate functional group;
   c) mixing the aqueous media containing the titanium dioxide pigment particles and the selected polymeric latex particles;
   d) permitting the selected polymeric latex particles to adsorb on the titanium dioxide particles to form composite particles, the composite particles not comprising a continuous layer of polymer enveloping the surface of the respective titanium dioxide particles; and
   e) then providing an effective amount of dibasic phosphate to the mixture of selected polymeric latex particles and titanium dioxide particles.

2. A process for preparing an aqueous dispersion including selected polymeric latex particles and titanium dioxide pigment particles and for controlling the adsorption of the selected polymeric latex particles on the titanium dioxide particles, the process comprising:

a) preparing a dispersion or suspension of selected polymeric latex particles in an aqueous medium, the selected polymeric latex particles having at least one dihydrogen phosphate functional group;
   b) dispersing titanium dioxide pigment particles in the aqueous medium;
   c) permitting the selected polymeric latex particles to adsorb on the titanium dioxide particles to a predetermined extent to form composite particles, the composite particles not comprising a continuous layer of polymer enveloping the surface of the respective titanium dioxide particles; and
   d) then providing an effective amount of dibasic phosphate to the mixture of selected polymer latex particles and titanium dioxide particles.

3. A process for preparing an aqueous dispersion including selected polymeric latex particles and titanium dioxide pigment particles and for controlling the adsorption of the selected polymeric latex particles on the titanium dioxide particles, the process comprising:
a) dispersing titanium dioxide pigment particles in a first aqueous medium;
b) preparing a dispersion or suspension of selected polymeric latex particles in a second aqueous medium, the selected polymeric latex particles having at least one dihydrogen phosphate functional group;
c) mixing the aqueous media containing the titanium dioxide pigment particles and the selected polymeric latex particles;
d) permitting the selected polymeric latex particles to adsorb on the titanium dioxide particles to form composite particles, the composite particles not comprising a continuous layer of polymer enveloping the surface of the respective titanium dioxide particles; and
e) then providing an effective amount of dibasic phosphate to the mixture of selected polymeric latex particles and titanium dioxide particles, the phosphate salt being provided at least about ten minutes after first mixing the aqueous media containing the titanium dioxide pigment particles and the selected polymeric latex particles.

4. A process for preparing an aqueous dispersion including selected polymeric latex particles and titanium dioxide pigment particles and for controlling the adsorption of the selected polymeric latex particles on the titanium dioxide particles, the process comprising:
a) preparing a dispersion or suspension of selected polymeric latex particles in an aqueous medium, the selected polymeric latex particles having at least one dihydrogen phosphate functional group;
b) dispersing titanium dioxide pigment particles in the aqueous medium;
c) permitting the selected polymeric latex particles to adsorb on the titanium dioxide particles to a predetermined extent to form composite particles, the composite particles not comprising a continuous layer of polymer enveloping the surface of the respective titanium dioxide particles; and
d) then providing an effective amount of dibasic phosphate to the mixture of selected polymer latex particles and titanium dioxide particles, the phosphate salt being provided at least about ten minutes after the titanium dioxide pigment particles are first dispersed in the aqueous media containing the selected polymeric latex particles.

5. A process according to claim 3 wherein the dibasic phosphate is provided by adding a water-soluble phosphate salt to the mixture of selected polymeric latex particles and titanium dioxide particles.

6. A process according to claim 5 wherein the water-soluble phosphate salt is dibasic ammonium phosphate.

7. A process according to claim 3 wherein the selected polymeric latex particles are prepared by polymerization of monomers including at least one copolymerizable dihydrogen phosphate-functional monomer.

8. A process according to claim 3 wherein the phosphate salt is added during the period extending from about one half hour to about four hours after the aqueous media containing the titanium dioxide pigment particles and the selected polymeric latex particles are first mixed.

9. A process according to claim 5 wherein the amount of phosphate salt added is from about 0.25 weight percent to about 2 weight percent based on the titanium dioxide solids and expressed as dibasic ammonium phosphate.

10. A process according to claim 3 wherein the average particle size of the selected polymeric latex particles is less than about 135 nm.

11. A process according to claim 10 wherein the average particle size of the selected polymeric latex particles is about 105 nm.

12. A process according to claim 3 wherein the selected polymeric latex includes dihydrogen phosphate ester functional groups, the selected polymeric latex being polymerized from monomer including at least one polymerizable dihydrogen phosphate-functional monomer selected from the class consisting of:
the phosphoric acid monoester of 2-hydroxyethyl methacrylate,
the phosphoric acid diester of 2-hydroxyethyl methacrylate,
the phosphoric acid monoester of 3-hydroxypropyl methacrylate,
and the phosphoric acid diester of 3-hydroxypropyl methacrylate,
the dihydrogen vinylbenzylphosphates,
$CH_2=CCH_3CO_2CH_2CH[OPO(OH)_2]CH_3$ and
$CH_2=CCH_3CO_2CH_2CHOHCH_2OPO(OH)_2$.

13. A process according to claim 3 wherein the selected polymeric latex has an effective glass transition temperature greater than about 20° C.

14. A process according to claim 13 wherein the selected polymeric latex has an effective glass transition temperature greater than about 50° C.

15. A process according to claim 3 wherein the average size of the selected polymeric latex particles is from about 20 nm to about four times the average particle size of the titanium dioxide pigment particles.

16. A process according to claim 15 wherein the average size of the selected polymeric latex particles is from about one-half the average size of the titanium dioxide pigment particles to about equal to the average size of the titanium dioxide pigment particles.

17. A process according to claim 3 wherein the effective glass transition temperature of the selected polymeric latex is less than about 20° C., the average particle size of the selected polymeric latex being to provide, at a predetermined pigment volume concentration for a corresponding coatings product, enough selected polymeric latex particles to effectively cover the surface of each titanium dioxide particle on formation of the composite particles.

18. A process according to claim 3 further comprising mixing an aqueous dispersion of polymeric latex binder particles with the aqueous dispersion including selected polymeric latex particles and titanium dioxide pigment particles.

19. A coating composition produced according to the process of claim 3.

20. A coating composition according to claim 19 having a PVC from about 5 to 60 percent.

21. A coating composition according to claim 20 having a PVC from about 10 to 50 percent.

* * * * *